US012780021B2

(12) United States Patent
Yang et al.

(10) Patent No.: US 12,780,021 B2

(45) Date of Patent: Nov. 3, 2026

(54) BATTERY CHARGING SYSTEM AND EXTERNAL VOLTAGE CONVERSION DEVICE FOR THE SAME

(71) Applicants: Hyundai Motor Company, Seoul (KR); Kia Corporation, Seoul (KR)

(72) Inventors: Si Hun Yang, Hwaseong-si (KR); Jin Young Yang, Hanam-si (KR); In Yong Yeo, Bucheon-si (KR); Jong Eun Byun, Suwon-si (KR); Sang Jin Kim, Hwaseong-si (KR); Dae Woo Lee, Incheon (KR); Min Seong Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1008 days.

(21) Appl. No.: 17/985,589

(22) Filed: Nov. 11, 2022

(65) Prior Publication Data

US 2024/0017629 A1 Jan. 18, 2024

(30) Foreign Application Priority Data

Jul. 12, 2022 (KR) ........................ 10-2022-0085741

(51) Int. Cl.

| | |
|---|---|
| ***B60L 53/22*** | (2019.01) |
| ***B60L 53/10*** | (2019.01) |
| ***B60L 53/16*** | (2019.01) |
| ***H02J 7/02*** | (2016.01) |
| ***H02M 1/42*** | (2007.01) |

(52) U.S. Cl.

CPC ............... *B60L 53/22* (2019.02); *B60L 53/11* (2019.02); *B60L 53/16* (2019.02); *H02J 7/02* (2013.01); *H02M 1/4258* (2013.01); *B60L 2210/30* (2013.01); *H02J 2207/20* (2020.01)

(58) Field of Classification Search

CPC ...... B60L 2210/30; B60L 53/16; B60L 53/22; B60L 53/30; H02J 2207/20; H02J 2310/48; H02J 7/02

See application file for complete search history.

(56) References Cited

U.S. PATENT DOCUMENTS

| | | | | |
|---|---|---|---|---|
| 8,817,507 | B2 * | 8/2014 | Liu | H02J 7/02 320/109 |
| 10,744,898 | B2 * | 8/2020 | Yang | B60L 58/20 |
| 10,759,287 | B2 * | 9/2020 | Vahedi | B60L 53/11 |

(Continued)

*Primary Examiner* — Julian D Huffman

*Assistant Examiner* — Sadia Kousar

(74) *Attorney, Agent, or Firm* — Slater Matsil, LLP

(57) ABSTRACT

An embodiment is battery charging system including an external voltage conversion device including an input unit configured to receive a system AC voltage, an output unit configured to output a charging DC voltage, and a power factor correction circuit including a first switching circuit connected to the input unit, a second switching circuit connected to the output unit, and a transformer connected between the first switching circuit and the second switching circuit, and an electrified vehicle including a charging port configured to receive the charging DC voltage, a battery, a motor having a plurality of windings, an inverter connected to each of one-side ends of the plurality of windings, and a relay connected between the charging port and a neutral terminal for the plurality of windings, the electrified vehicle controlling the relay upon recharging of the battery.

11 Claims, 6 Drawing Sheets

(56) References Cited

U.S. PATENT DOCUMENTS

| | | | | |
|---|---|---|---|---|
| 2015/0097528 | A1* | 4/2015 | Biagini | H02M 3/3382 320/109 |
| 2019/0148973 | A1* | 5/2019 | Kim | B60L 3/00 320/109 |
| 2021/0039506 | A1* | 2/2021 | Lee | B60L 50/14 |

* cited by examiner

BATTERY CHARGING SYSTEM AND EXTERNAL VOLTAGE CONVERSION DEVICE FOR THE SAME

CROSS-REFERENCE TO RELATED APPLICATIONS

This application claims the benefit of Korean Patent Application No. 10-2022-0085741, filed on Jul. 12, 2022, in the Korean Intellectual Property Office, which application is incorporated herein by reference.

TECHNICAL FIELD

The present disclosure relates to relates to a battery charging system.

BACKGROUND

Recently, in accordance with a global tendency toward a reduction in carbon dioxide emissions, demand for an electrified vehicle configured to generate driving power by driving a motor using electrical energy stored in an energy storage device such as a battery, in place of a typical internal combustion engine vehicle configured to generate driving power through combustion of fossil fuels, has been greatly increased.

As a system for recharging a battery equipped in an electrified vehicle, there are a rapid charging system and a slow charging system.

The rapid charging system means a system configured to recharge a battery by receiving a DC voltage from a rapid charging connector, etc. of electric vehicle supply equipment (EVSE) through a charging port for rapid charging and adjusting the received DC voltage through a DC/DC converter.

The slow charging system means a system configured to recharge a battery by receiving an AC voltage from a slow charging connector of electric vehicle supply equipment (EVSE), a charger for home or the like through a charging port for slow charging, and converting the received AC voltage into a DC voltage through an on-board charger (OBC).

Generally, the on-board charger (OBC) is constituted by a power factor correction circuit (PFC) configured to compensate a power factor of AC electric power, and a DC/DC converter configured to convert power factor-compensated electric power into a DC voltage required for a battery.

Recently, the charging capacity of the on-board charger (OBC) has been increased in order to increase the range of the electrified vehicle and, as such, the number of elements used and the area occupied by the on-board charger (OBC) has been increased. Therefore, a scheme capable of reducing the number of elements used and the area occupied by the on-board charger (OBC) is needed.

The above matters disclosed in this section are merely for enhancement of understanding of the general background of the disclosure and should not be taken as an acknowledgement or any form of suggestion that the matters form the related art already known to a person skilled in the alt.

SUMMARY

The present disclosure relates to relates to a battery charging system for stably and efficiently recharging a battery equipped in an electrified vehicle, and an external voltage conversion device for the same.

Therefore, the present disclosure has been made in view of the above problems, and it is an object of the present disclosure to reduce the number of elements used in and the area occupied by a battery charging system by substituting a DC/DC converter for rapid charging and a DC/DC converter for slow charging by an inverter for driving of a motor.

Another object of the present disclosure is to not only increase utility of an inner space of an electrified vehicle, but also to enable use of both a charging port for rapid charging and a charging port for slow charging through support of an external power conversion device including a power factor compensation circuit for slow charging.

In accordance with an aspect of the present disclosure, the above and other objects can be accomplished by the provision of a battery charging system including an external voltage conversion device including an input unit configured to receive a system AC voltage, an output unit configured to output a charging DC voltage, and a power factor correction circuit, the power factor correction circuit including a first switching circuit connected to the input unit, a second switching circuit connected to the output unit, and a transformer connected between the first switching circuit and the second switching circuit, and an electrified vehicle including a charging port configured to receive the charging DC voltage, a battery, a motor having a plurality of windings, an inverter connected to one-side ends of the plurality of windings, and a relay connected between the charging port and a neutral terminal for the plurality of windings, the electrified vehicle controlling the relay upon recharging of the battery.

The input unit may include first and second AC pins configured to receive the system AC voltage from a charging connector of electric vehicle supply equipment.

The output unit may include first and second DC pins configured to output the charging DC voltage to the charging port of the electrified vehicle.

The transformer may include a primary coil and a secondary coil. The first switching circuit may be connected to the first and second AC pins of the input unit and the primary coil. The second switching circuit may be connected to the first and second DC pins of the output unit and the secondary coil. The power factor correction circuit may further include an output capacitor connected between the first and second DC pins of the output unit.

The first switching circuit may include a first leg connected to the first AC pin via a first input inductor while being connected to one end of the primary coil, a second leg connected to the first AC pin via a second input inductor while being connected to the other end of the primary coil, and a third leg connected to the second AC pin.

The second switching circuit may further include a fourth leg connected between the first and second DC pins while being connected to one end of the secondary coil, and a fifth leg connected between the first and second DC pins while being connected to the other end of the secondary coil.

The charging port may include third and fourth DC pins configured to receive the charging DC voltage from the external voltage conversion device.

The electrified vehicle may further include an input capacitor connected between the third and fourth DC pins of the charging port. The relay may be connected between the third DC pin and the neutral terminal.

The electrified vehicle may further include a diode connected between a DC terminal, to which one end of the battery is connected, and the neutral terminal.

In accordance with another aspect of the present disclosure, there is provided an external voltage conversion device including an input unit configured to receive a system AC voltage, an output unit configured to output a charging DC voltage, a power factor correction circuit including a first switching circuit connected to the input unit, a second switching circuit connected to the output unit, and a transformer connected between the first switching circuit and the second switching circuit, and a power factor correction controller configured to adjust a switching phase of at least one leg included in the second switching circuit with reference to a switching phase of at least one leg included in the first switching circuit.

The power factor correction controller may set a switching frequency of a fourth leg to be equal to a switching frequency of a first leg, and may adjust a switching phase of the fourth leg with reference to a switching phase of the first leg. The power factor correction controller may set a switching frequency of a fifth leg to be equal to a switching frequency of a second leg, and may adjust a switching phase of the fifth leg with reference to a switching phase of the second leg.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF ILLUSTRATIVE EMBODIMENTS

In the following description of embodiments, the term "predetermined" means that, when a parameter is used in a process or an algorithm, the numerical value of the parameter has been previously determined. The numerical value of the parameter may be set when the process or the algorithm is begun or during a period in which the process or algorithm is executed in accordance with an embodiment.

It will be understood that, although the terms "first," "second," etc. may be used herein to distinguish various elements from one another, these elements should not be limited by these terms. For example, a first constituent element may be referred to as a second constituent element, and, conversely, the second constituent element may be referred to as the first constituent element.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Hereinafter, the present disclosure will be described in more detail in conjunction with embodiments. However, the embodiments are only for illustration of the present disclosure and, as such, the scope of the present disclosure is not limited to the embodiments.

Figure 1:
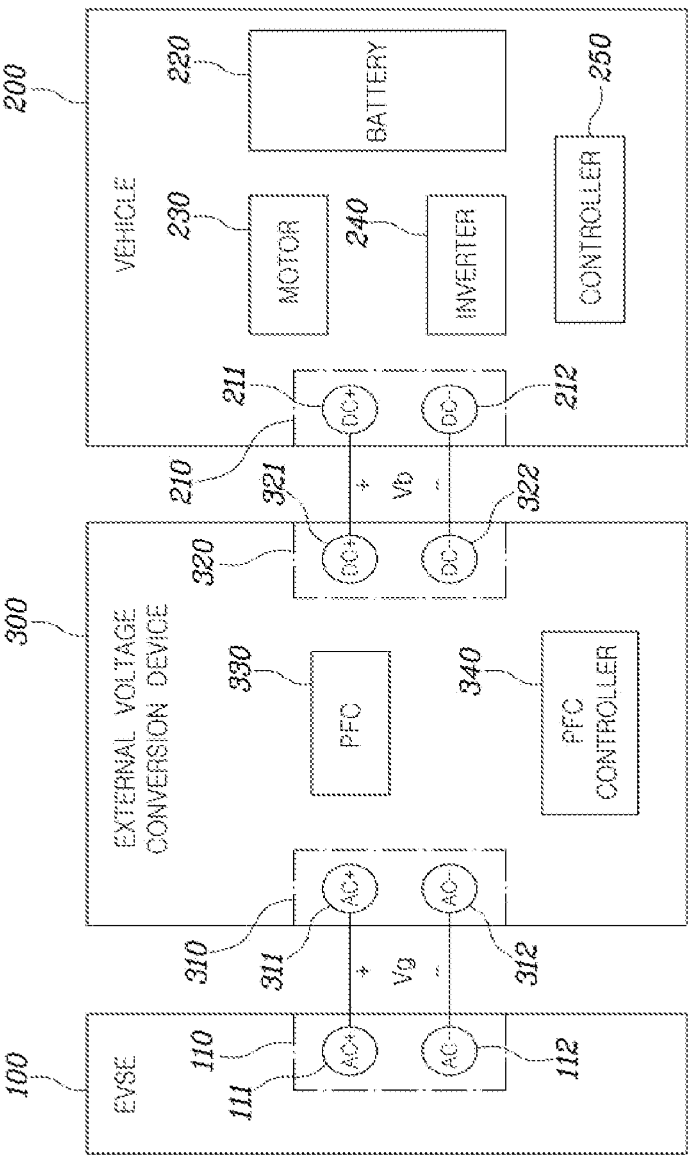
FIG. 1 is a block diagram showing a configuration of a battery charging system for slow charging according to an exemplary embodiment of the present disclosure.

FIG. 1 is a block diagram showing a configuration of a battery charging system for slow charging according to an exemplary embodiment of the present disclosure.

As shown in FIG. 1, the battery charging system for slow charging may include electric vehicle supply equipment (EVSE) 100, an electrified vehicle 200, and an external voltage conversion device 300.

The electric vehicle supply equipment 100 may include a slow charging connector 110 having AC pins in and 112 configured to output a system AC voltage Vg.

The electrified vehicle 200 may include a charging port 210 having DC pins 211 and 212 configured to receive a charging DC voltage Vb, a battery 220, a motor 230, an inverter 240 configured to drive the motor 230 based on a voltage of the battery 220, and a controller 250 configured to control driving of the inverter 240.

When the charging DC voltage Vb is applied to the electrified vehicle 200 via the charging port 210, the controller 250 controls the inverter 240 to operate as a DC/DC converter and, as such, the inverter 240 may recharge the battery 220 by adjusting the charge DC voltage Vb through the motor 230. Thus, a DC/DC converter for rapid charging is substituted by the inverter 240 for driving of the motor 230 and, as such, it may be possible to reduce the number of elements used in and the area occupied by the battery charging system.

The external voltage conversion device 300 may include an input unit 310 connected to the slow charging connector 110 of the electric vehicle supply equipment 100, an output unit 320 connected to the charging port 210 of the electrified vehicle 200, a power factor correction circuit (PFC) 330 connected between the input unit 310 and the output unit 320 and configured to convert the system AC voltage Vg into the charging DC voltage Vb, and a power factor correction controller 340 configured to control driving of the power factor correction circuit 330. The input unit 310 may have AC pins 311 and 312 configured to receive the system AC voltage Vg from the slow charging connector 110, whereas the output unit 320 may have DC pins 321 and 322 configured to output the charging DC voltage Vb to the charging port 210 of the electrified vehicle 200. The external voltage conversion device 300 may be implemented as a portable device.

In accordance with the exemplary embodiment of the present disclosure, the power factor correction circuit 330 is not equipped in the electrified vehicle 200, but is equipped in the external voltage conversion device 300, and, as such, it may be possible to increase utility of an inner space of the electrified vehicle 200.

In addition, since the external voltage conversion device 300 is connected between the electric vehicle supply equipment 100 and the electrified vehicle 200, it may be possible to substitute the DC/DC converter for slow charging by the inverter 240 for driving of the motor 230 and to enable use of both a charging port for rapid charging and a charging port for slow charging through the charging poll 210 of the electrified vehicle 200.

Figure 2:
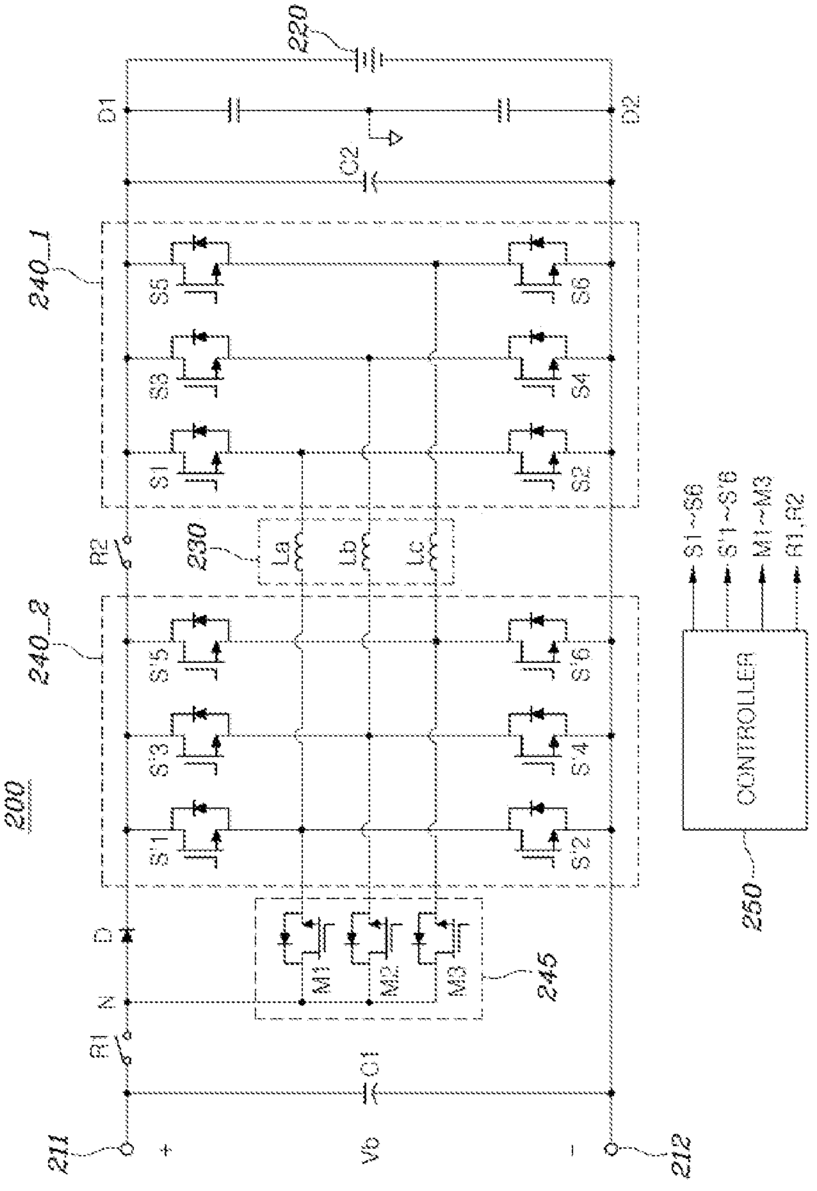
FIG. 2 is a circuit diagram showing a configuration of an electrified vehicle according to an exemplary embodiment of the present disclosure.

FIG. 2 is a circuit diagram showing a configuration of the electrified vehicle 200 according to an exemplary embodiment of the present disclosure.

As shown in FIG. 2, the electrified vehicle 200 may include DC pins 211 and 212 configured to receive a charging DC voltage Vb, a battery 220 connected between DC terminals D1 and D2, a motor 230, a first inverter 240_1, a second inverter 240_2, a driving mode switching unit 245, and the controller 250.

The motor 230 may have a plurality of windings La, Lb and Lc respectively corresponding to a plurality of phases. The first inverter 240_1 may include a plurality of legs S1-S2, S3-S4 and S5-S6 connected between the DC terminals D1 and D2 while being connected to respective one-side ends of the plurality of windings La, Lb and Lc. The second inverter 240_2 may include a plurality of legs S'1-S'2, S'3-S'4 and S'5-S'6 connected between the DC terminals D1 and D2 while being connected to respective other-side ends of the plurality of windings La, Lb and Lc. In this embodiment, the leg means a configuration in which a plurality of switch elements is interconnected. Each of the switch elements S1 to S6 and S'1 to S'6 may be implemented as a transistor.

The driving mode switching unit 245 may include a plurality of selection switches M1 to M3. One-side ends of the selection switches M1 to M3 may be connected to a neutral terminal N for the plurality of windings La, Lb and Lc, and other-side ends of the selection switches M1 to M3 may be connected to respective other-side ends of the plurality of windings La, Lb and Lc. Turn-on states of the plurality of selection switches M1 to M3 may be controlled by the controller 250 in accordance with a driving mode of the motor 230. Accordingly, the motor 230 may be driven through only the first inverter 240_1 or through both the first inverter 240_1 and the second inverter 240_2. Each of the selection switches M1 to M3 may be implemented as a transistor.

A diode D may be connected between the DC terminal D1 and the neutral terminal N. An input capacitor C1 may be connected between the DC pins 211 and 212. An output capacitor C2 may be connected between the DC terminal D1 and the DC terminal D2.

A relay R1 may be connected between the DC pin 211 and the neutral terminal N. The controller 250 may control the relay R1 to be turned on upon recharging of the battery 220, thereby causing the DC pin 211 and the motor 230 to be electrically interconnected.

Upon recharging of the battery 220, the controller 250 may control a conduction state between the neutral terminal N and the plurality of windings La, Lb and Lc through the selection switches M1 to M3, and may determine whether or not the first inverter 240_1 should operate as a DC/DC converter.

In more detail, when the controller 250 controls the plurality of selection switches M1 to M3 to be turned off, thereby achieving a non-conduction state between the neutral terminal N and the plurality of windings La, Lb and Lc, current of the neutral terminal N may output to the battery 220 through the diode D. In this case, the controller 250 may control a relay R2 connected between the diode D and the DC terminal D1 to be turned on.

Conversely, when the controller 250 controls the plurality of selection switches M1 to M3 to be turned on, thereby achieving a conduction state between the neutral terminal N and the plurality of windings La, Lb and Lc, current of the neutral terminal N may output to the plurality of windings La, Lb and Lc. In this case, the controller 250 may control switching of the plurality of legs S1-S2, S3-S4 and S5-S6 included in the first inverter 240_1 and, as such, the charging DC voltage Vb may be output to the battery 220 after being boosted or dropped through the first inverter 240_1. In this embodiment, switching of a leg means complementary switching of a plurality of switch elements included in the leg.

Figure 3:
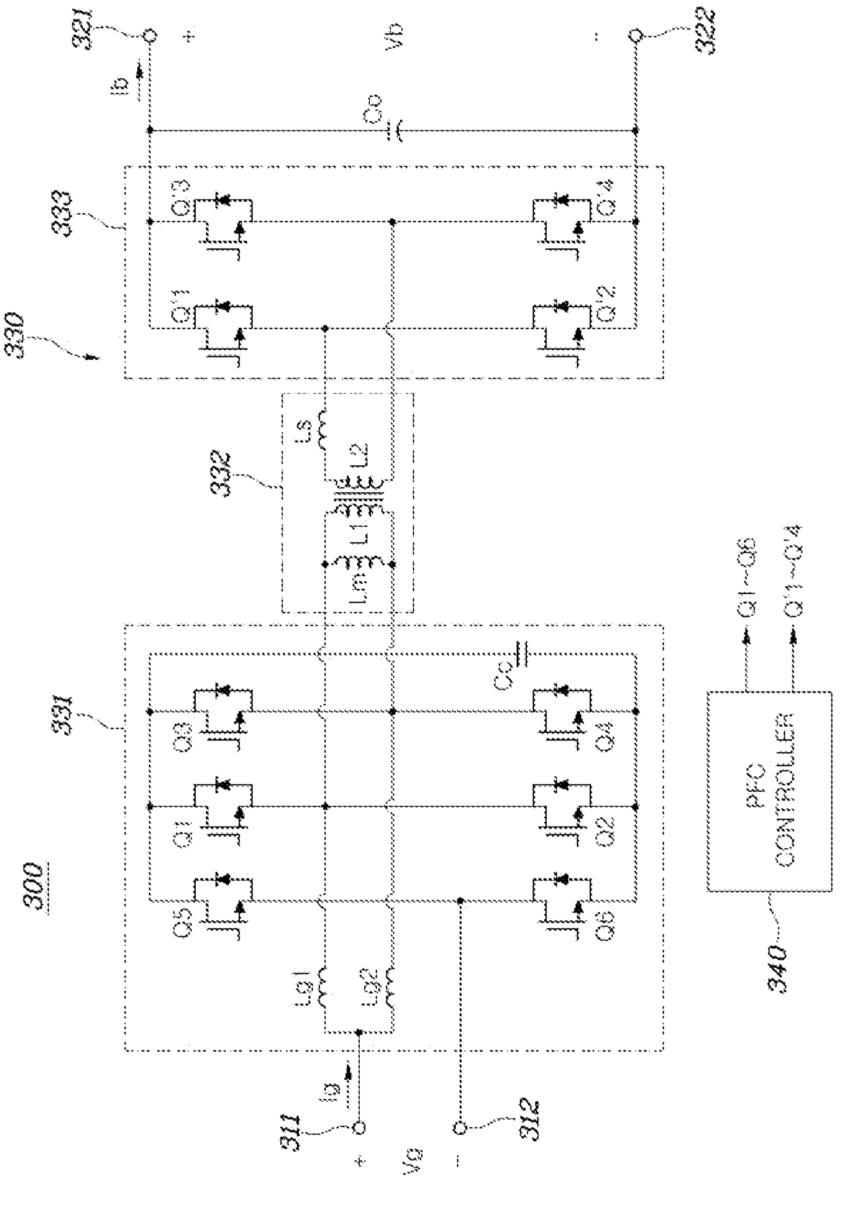
FIG. 3 is a circuit diagram showing a configuration of an external voltage conversion device according to an exemplary embodiment of the present disclosure.

FIG. 3 is a circuit diagram showing a configuration of the external voltage conversion device 300 according to an exemplary embodiment of the present disclosure.

As shown in FIG. 3, the external voltage conversion device 300 may have AC pins 311 and 312 configured to receive a system AC voltage Vg and DC pins 321 and 322 configured to output a charging DC voltage Vb, and may include a power factor correction circuit 330 and a power factor correction controller 340. System alternating current Ig may flow through the AC pin 311, whereas charging direct current Ib may flow through the DC pin 321.

The power factor correction circuit 330 may include a first switching circuit 331 connected to the AC pins 311 and 312, and a second switching circuit 333 connected to the DC pins 321 and 322. The power factor correction circuit 330 may also include a transformer 332 connected between the first switching circuit 331 and the second switching circuit 333 in order to electrically insulate electric vehicle supply equipment 100 (FIG. 1) and an electrified vehicle 200 (FIG. 1) from each other. The transformer 332 may include a primary coil L1, a secondary coil L2, a magnetization inductor Lm, and a leakage inductor Ls. The transformer 332 may transform current and a voltage in accordance with a winding ratio between the primary coil L1 and the secondary coil L2. An output capacitor Co may be connected between the DC pins 321 and 322.

The first switching circuit 331 may include a plurality legs Q1-Q2, Q3-Q4 and Q5-Q6. Each of the switch elements Q1 to Q6 may be implemented as a transistor.

The leg Q1-Q2 may be connected to the AC pin 311 via an input inductor Lg1 while being connected to one end of the primary coil L1 of the transformer 322. The leg Q3-Q4 may be connected to the AC pin 311 via an input inductor Lg2 while being connected to the other end of the primary coil L1 of the transformer 332. The leg Q1-Q2 and the leg Q3-Q4 may be switched at a high frequency in an interleaving manner by the power factor correction controller 340. The leg Q5-Q6 may be connected to the AC pin 312, and may be switched at a frequency of the system AC voltage Vg (a low frequency) by the power factor correction controller 340, for synchronous rectification control. A clamp capacitor Cc may be connected between both ends of the plurality of legs Q1-Q2, Q3-Q4 and Q5-Q6.

The second switching circuit 333 may include legs Q'1-Q'2 and Q'3-Q'4 each configured to form a dual active bridge (DAB) structure together with a corresponding one of the legs Q1-Q2 and Q3-Q4. The leg Q'1-Q'2 may be connected between the DC pins 321 and 322 while being connected to one end of the secondary coil L2 of the transformer 332. The leg Q'3-Q'4 may be connected between the DC pin 321 and 322 while being connected to the other end of the secondary coil L2 of the transformer 332. Each of the switch elements Q'1 to Q'4 may be implemented as a transistor.

The power factor correction controller 340 may set switching frequencies of the legs Q1-Q2 and Q3-Q4 included in the first switching circuit 331 and switching frequencies of the legs Q'1-Q'2 and Q'3-Q'4 included in the second switching circuit 333 to be equal to each other. In more detail, the switching frequency of the leg Q'1-Q'2 may be set to be equal to the switching frequency of the leg Q1-Q2, and the switching frequency of the leg Q'3-Q'4 may be set to be equal to the switching frequency of the leg Q3-Q4.

In addition, the power factor correction controller 340 may adjust switching phases of the legs Q'1-Q'2 and Q'3-Q'4 included in the second switching circuit 333 with reference to switching phases of the legs Q1-Q2 and Q3-Q4 included in the first switching circuit 331. In more detail, the switching phase of the leg Q'1-Q'2 may be adjusted with reference to the switching phase of the leg Q1-Q2, and the switching phase of the leg Q'3-Q'4 may be adjusted with reference to the switching phase of the leg Q3-Q4. Accordingly, the power factor correction circuit 330 may control the charging direct current Ib.

Figure 4:
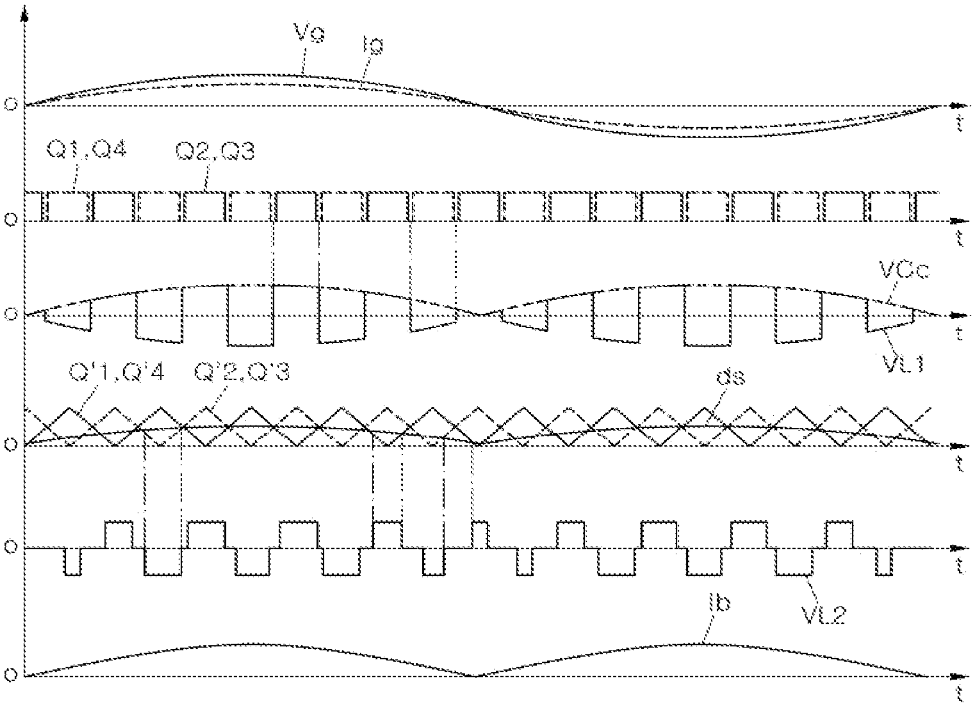
FIG. 4 is a waveform diagram explaining operation of the external voltage conversion device shown in FIG. 3.

FIG. 4 is a waveform diagram explaining operation of the external voltage conversion device 300 shown in FIG. 3. Referring to FIG. 4, waveforms of the system AC voltage Vg, the system alternating current Ig and the charging direct current Ib are shown. The output current Ib may be determined by a voltage VIA of the primary coil L1 and a voltage VL2 of the secondary coil L2.

The power factor correction controller 340 may switch the legs Q1-Q2 and Q3-Q4 in an interleaving manner. In more detail, the power factor correction controller 340 may switch the switch elements Q1 and Q4 and the switch elements Q2 and Q3 at a phase interval of 180°. Accordingly, the voltage VIA of the primary coil L1 may be varied in polarity at a phase interval of 180°. In addition, an upper limit of the voltage VIA of the primary coil L1 may be set as a voltage VCc of the clamp capacitor Cc.

The power factor correction controller 340 may switch the switch elements Q'1 and Q'4 based on a carrier wave and a signal wave ds for the switch elements Q'1 and Q'4, and may switch the switch elements Q'2 and Q'3 based on a carrier wave and a signal wave ds for the switch elements Q'2 and Q'3. Accordingly, the voltage VL2 of the secondary coil L2 may have a waveform as shown in FIG. 4.

Figure 5:
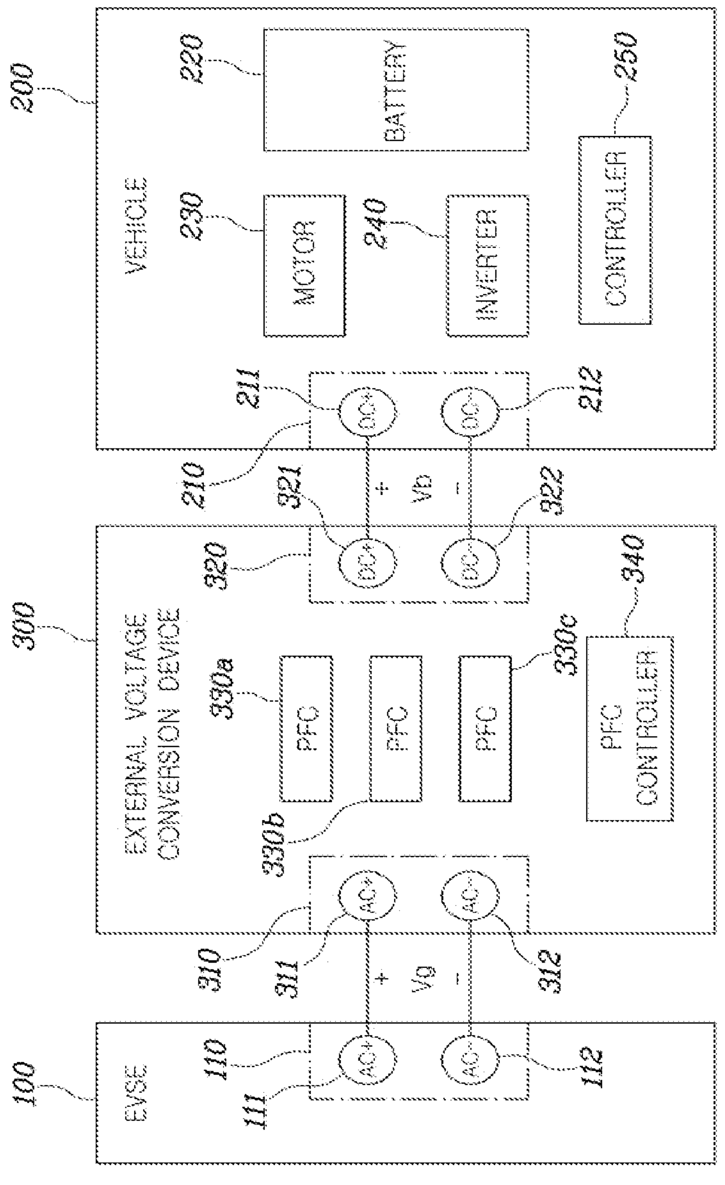
FIG. 5 is a block diagram showing a configuration of a battery charging system for slow charging according to another exemplary embodiment of the present disclosure.

FIG. 5 is a block diagram showing a configuration of a battery charging system for slow charging according to another exemplary embodiment of the present disclosure.

As shown in FIG. 5, an external voltage conversion device 300 may include a plurality of power factor correction circuits 330*a*, 330*b* and 330*c*. Each of the plurality of power factor correction circuits 330*a*, 330*b* and 330*c* may be implemented identically to the power factor correction circuit 330 shown in FIG. 3. As the external voltage conversion device 300 includes the plurality of power factor correction circuits 330*a*, 330*b* and 330*c*, it may be possible to adjust output electric power of the external voltage conversion device 300, corresponding to the current infra status for electric vehicle supply equipment 100, and to convert a system AC voltage Vg into a charging DC voltage Vb, irrespective of single-phase and three-phase AC voltage sources.

Figure 6:
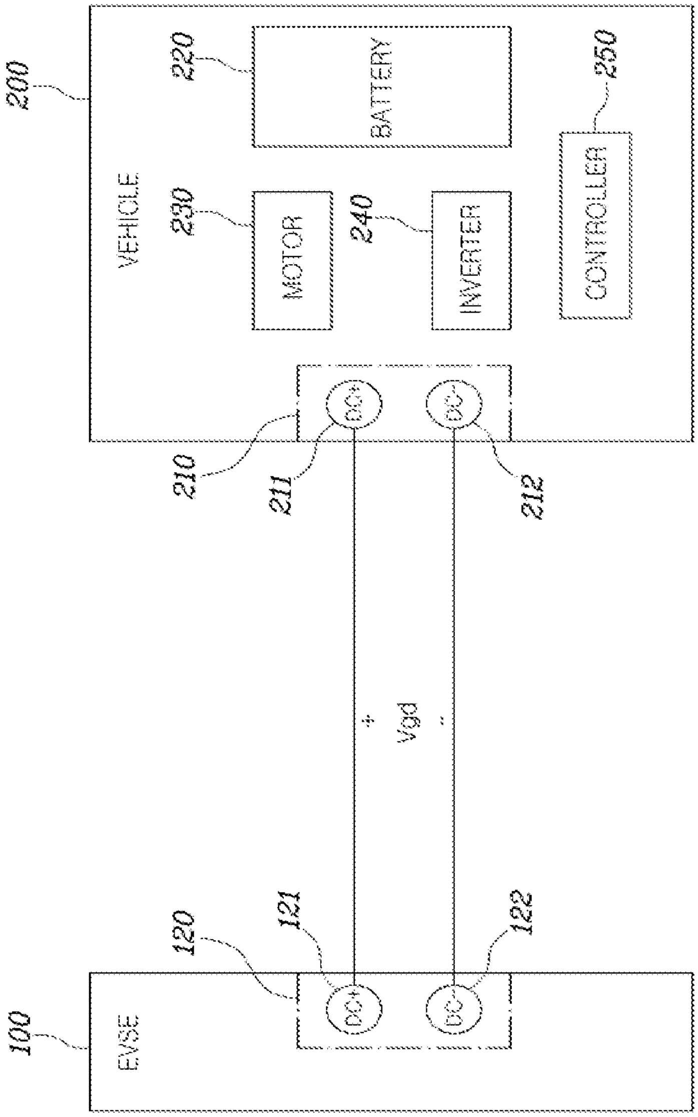
FIG. 6 is a block diagram showing a configuration of a battery charging system for rapid charging according to another exemplary embodiment of the present disclosure.

FIG. 6 is a block diagram showing a configuration of a battery charging system for rapid charging according to another exemplary embodiment of the present disclosure.

As shown in FIG. 6, in the battery charging system for rapid charging, electric vehicle supply equipment 100 may include a rapid charging connector 120 having DC pins 121 and 122 configured to output a system DC voltage Vgd. The battery charging system for rapid charging may recharge a battery 220 equipped in an electrified vehicle 200 by coupling the rapid charging connector of the electric vehicle supply equipment 100 to a charging poll 210 of the electrified vehicle 200 without using an external voltage conversion device 300 (FIG. 1).

The present disclosure as described above may be embodied as computer-readable code, which can be written on a program-stored recording medium. The recording medium that can be read by a computer includes all kinds of recording media, on which data that can be read by a computer system is written. Examples of recording media that can be read by a computer may include a hard disk drive (HDD), a solid state drive (SSD), a silicon disk drive (SDD), a read only memory (ROM), a random access memory (RAM), a CD-ROM, a magnetic tape, a floppy disk, an optical data storage, etc. Accordingly, the above detailed description is not intended to limit the present disclosure, and it should be understood that the present disclosure is determined in accordance with reasonable interpretation of the appended claims, and all changes within an equivalent scope of the present disclosure fall within the scope of the present disclosure.

As apparent from the above description, in accordance with the exemplary embodiments of the present disclosure, it may be possible to reduce the number of elements used in and the area occupied by a battery charging system by substituting a DC/DC converter for rapid charging and a DC/DC converter for slow charging by an inverter for driving of a motor.

In addition, in accordance with the exemplary embodiments of the present disclosure, it may be possible to not only increase utility of an inner space of an electrified vehicle, but also to enable use of both a charging port for rapid charging and a charging port for slow charging through support of an external power conversion device including a power factor correction circuit for slow charging.

The effects of the embodiments of the present disclosure are not limited to the above-described effects and other effects which are not described herein may be derived by those skilled in the art from the description of the embodiments of the disclosure.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A battery charging system comprising:
- an external voltage conversion device implemented as a portable device and comprising:
  - an input unit configured to receive a system AC voltage;
  - an output unit configured to output a charging DC voltage; and
  - a power factor correction circuit, the power factor correction circuit comprising:
    - a first switching circuit connected to the input unit;
    - a second switching circuit connected to the output unit;
    - a transformer connected between the first switching circuit and the second switching circuit; and
    - a power factor correction controller; and
- an electrified vehicle comprising:
  - a charging port configured to receive the charging DC voltage from the output unit of the external voltage conversion device;
  - a battery;
  - a motor having a plurality of windings;
  - an inverter connected to one-side ends of the plurality of windings; and a relay connected between the charging port and a neutral terminal for the plurality of windings, wherein:

the electrified vehicle controls the relay upon recharging of the battery, the transformer includes a primary coil and a secondary coil, the first switching circuit comprises:

a first leg coupled to a first AC pin of the input unit through a first input inductor and coupled to a first end of the primary coil;

a second leg coupled to the first AC pin through a second input inductor and coupled to a second end of the primary coil; and a third leg coupled to a second AC pin of the input unit, the second switching circuit comprises:

a fourth leg coupled between first DC pins and second DC pins of the output unit and coupled to a first end of the secondary coil; and a fifth leg coupled between the first DC pins and the second DC pins and coupled to a second end of the secondary coil, and the power factor correction controller is configured to:

set a switching frequency of the fourth leg to be equal to a switching frequency of the first leg;

adjust a switching phase of the fourth leg based on the switching phase of the first leg;

set a switching frequency of the fifth leg to be equal to a switching frequency of the second leg; and adjust a switching phase of the fifth leg based on the switching phase of the second leg.

2. The battery charging system according to claim 1, wherein the input unit comprises first input unit AC pins and second input unit AC pins configured to receive the system AC voltage from a charging connector of electric vehicle supply equipment.

3. The battery charging system according to claim 1, wherein the output unit comprises first output unit DC pins and second output unit DC pins configured to output the charging DC voltage to the charging port of the electrified vehicle.

4. The battery charging system according to claim 1, wherein:

the power factor correction circuit further comprises an output capacitor connected between the first DC pins and the second DC pins of the output unit.

5. The battery charging system according to claim 1, wherein the charging port comprises third DC pins and fourth DC pins configured to receive the charging DC voltage from the external voltage conversion device.

6. The battery charging system according to claim 1, wherein:

the electrified vehicle further comprises an input capacitor connected between third DC pins and fourth DC pins of the charging port, and the relay is connected between the third DC pins and the neutral terminal.

7. The battery charging system according to claim 6, wherein the electrified vehicle further comprises a diode connected between a DC terminal, to which one end of the battery is connected, and the neutral terminal.

8. An external voltage conversion device comprising:

an input unit configured to receive a system AC voltage;

an output unit configured to output a charging DC voltage to a charging port of an electrified vehicle;

a power factor correction circuit comprising:

a first switching circuit connected to the input unit;

a second switching circuit connected to the output unit; and a transformer connected between the first switching circuit and the second switching circuit; and a power factor correction controller configured to adjust a switching phase of at least one leg comprised in the second switching circuit with reference to a switching phase of at least one leg comprised in the first switching circuit, wherein:

the external voltage conversion device is implemented as a portable device, the transformer includes a primary coil and a secondary coil, the first switching circuit comprises:

a first leg coupled to a first AC pin of the input unit through a first input inductor and coupled to a first end of the primary coil;

a second leg coupled to the first AC pin through a second input inductor and coupled to a second end of the primary coil; and a third leg coupled to a second AC pin of the input unit, the second switching circuit comprises:

a fourth leg coupled between first DC pins and second DC pins of the output unit and coupled to a first end of the secondary coil; and a fifth leg coupled between the first DC pins and the second DC pins and coupled to a second end of the secondary coil, and the power factor correction controller is configured to:

set a switching frequency of the fourth leg to be equal to a switching frequency of the first leg;

adjust a switching phase of the fourth leg with reference to a switching phase of the first leg;

set a switching frequency of the fifth leg to be equal to a switching frequency of the second leg; and adjust a switching phase of the fifth leg with reference to a switching phase of the second leg.

9. The external voltage conversion device according to claim 8, wherein the input unit comprises first input unit AC pins and second input unit AC pins configured to receive the system AC voltage from a charging connector of electric vehicle supply equipment.

10. The external voltage conversion device according to claim 8, wherein the output unit comprises first output unit DC pins and second output unit DC pins configured to output the charging DC voltage to the charging port of the electrified vehicle.

11. The external voltage conversion device according to claim 8, wherein:

the power factor correction circuit further comprises an output capacitor connected between the first DC pins and the second DC pins of the output unit.

* * * * *